Figure 1:
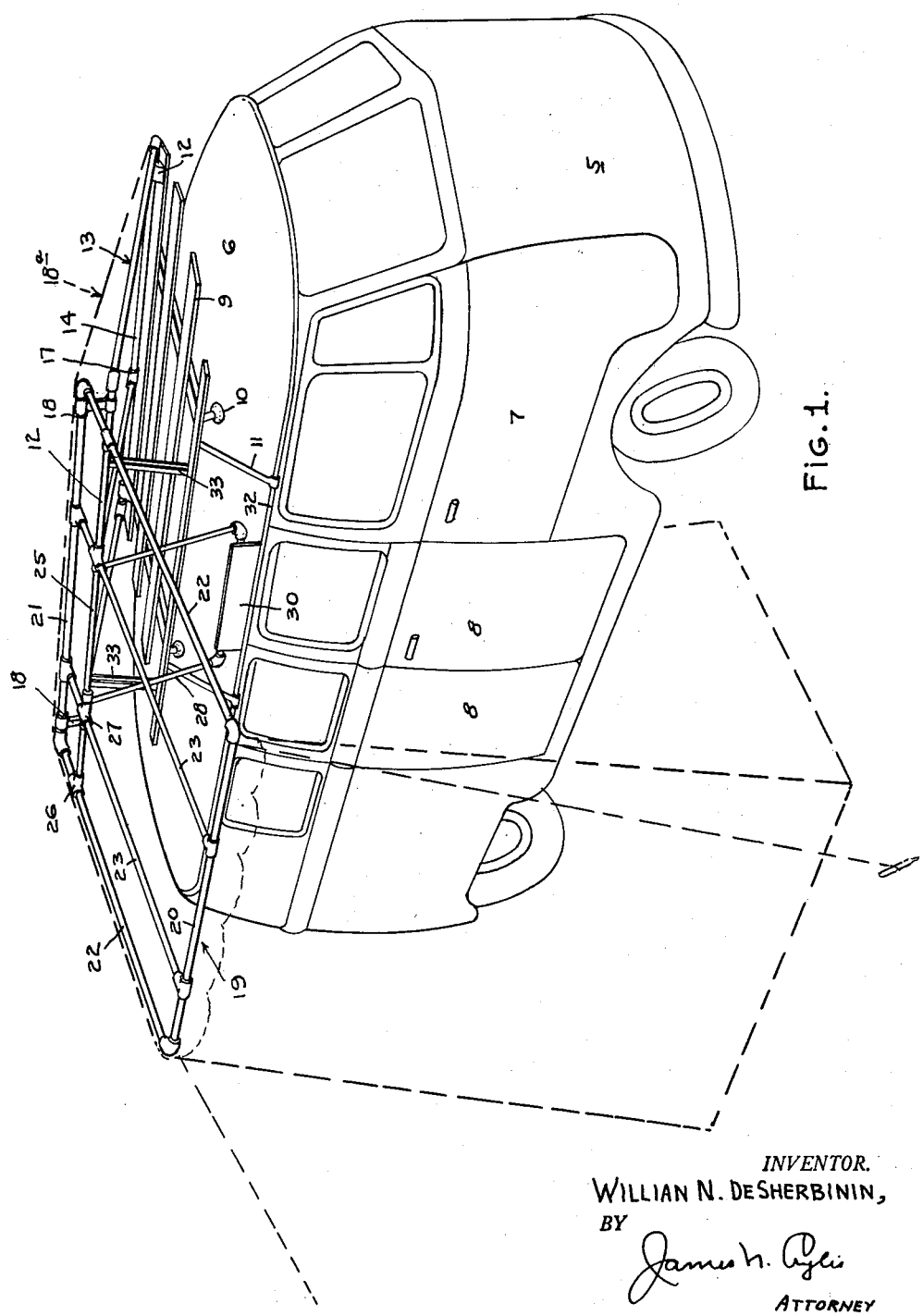

Sept. 17, 1957 W. N. DE SHERBININ 2,806,478
COLLAPSIBLE SHELTER DEVICE FOR MOTOR VEHICLES
Filed Sept. 7, 1956 3 Sheets-Sheet 1

INVENTOR.
WILLIAN N. DeSHERBININ,
BY
ATTORNEY

INVENTOR.
WILLIAN N. DE SHERBININ,
BY
ATTORNEY

Sept. 17, 1957  W. N. DE SHERBININ  2,806,478
COLLAPSIBLE SHELTER DEVICE FOR MOTOR VEHICLES
Filed Sept. 7, 1956  3 Sheets-Sheet 3

INVENTOR.
WILLIAM N. DeSHERBININ,
BY
ATTORNEY

United States Patent Office 2,806,478
Patented Sept. 17, 1957

2,806,478
COLLAPSIBLE SHELTER DEVICE FOR MOTOR VEHICLES

William N. de Sherbinin, Fort Lauderdale, Fla.

Application September 7, 1956, Serial No. 608,529

7 Claims. (Cl. 135—4)

This invention relates to improvements in collapsible and extensible frame devices for support upon the roof portion of a motor vehicle and whereby certain of the frame members may be shifted laterally to provide a support for a flexible and preferably water-proof covering.

The device embodies a pair of frame devices that are connected together and with one frame device being hingedly connected to a supporting rack structure that is carried upon the vehicle roof and whereby the swinging of one frame device laterally provides an extensible covering to one side of the vehicle and a covering over the major area of the vehicle roof.

The device further contemplates a pair of frame devices, and with one frame device embodying a prop that is engageable within the conventional vehicle gutter whereby the frames adjacent their connected portions are fulcrumed upwardly to dispose the frames in oppositely inclined manner whereby to dispose a supported flexible covering in spaced angled relation with respect to the vehicle roof and in angled relation to that extended area to be protected outwardly from the side of the vehicle.

The invention has particular utility with a vehicle of the type presently in use and commonly known as the Volkswagen and whereby the vehicle is provided with doors upon one side only for access to the rear compartment and with a forward door at opposite sides of the vehicle and whereby one forward door may be swung outwardly at approximately a ninety degree angle and with the two adjacent side doors being likewise shiftable outwardly and with the covering of the frames depending downwardly to overlie and conform to the forward door and to embrace the entire opening formed by the adjacent side doors whereby a complete enclosure is provided over the entire opening of the doors that extends for the major length of the vehicle and outwardly a distance determined by the extension of one frame member.

The invention further contemplates a novel arrangement or frame members that are readily shiftable and collapsible to be wholly disposed in overlying relation over the vehicle top, together with the flexibe covering and whereby to form a relatively compact collapsed unit that lies substantially close to the vehicle top.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
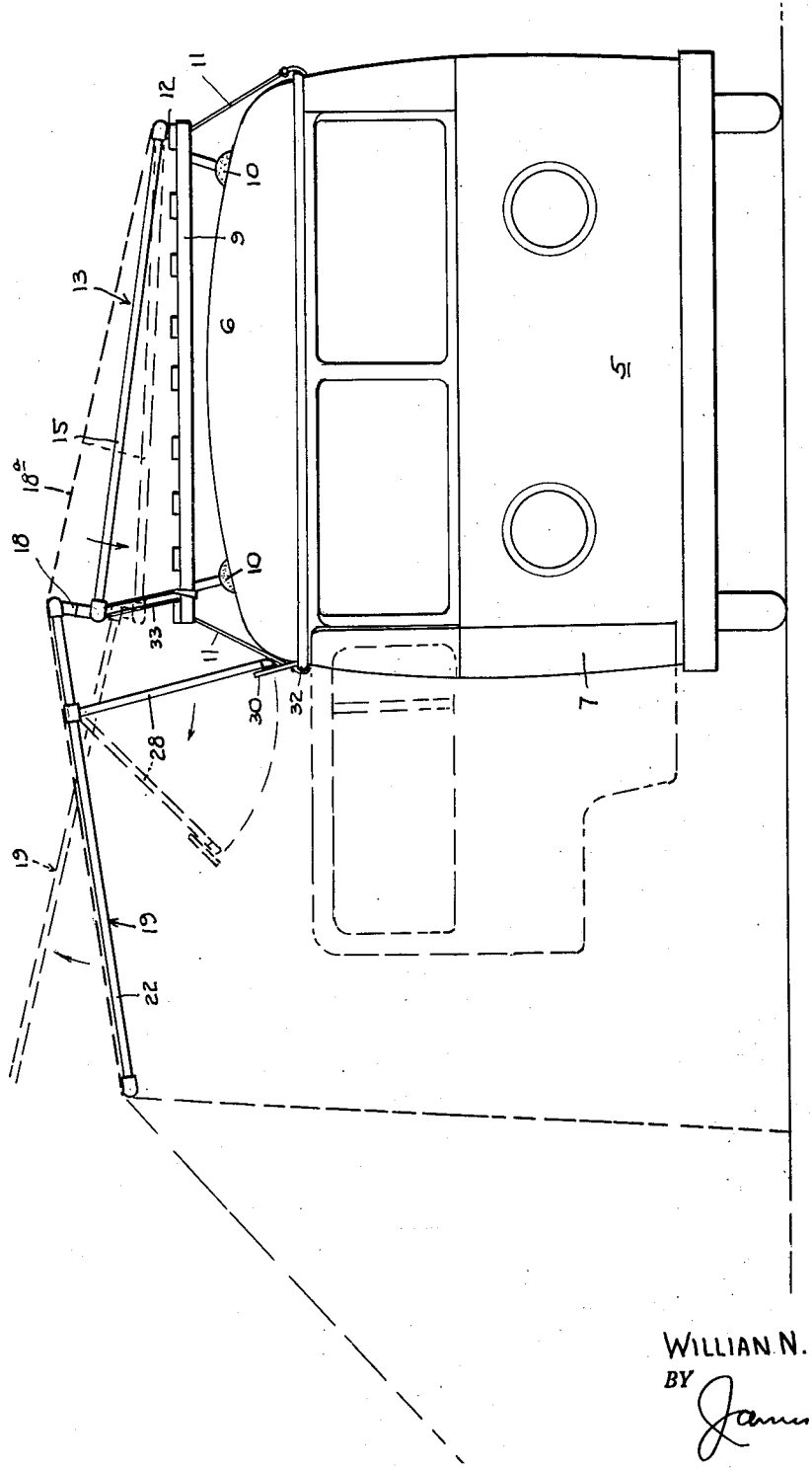
Figure 3:
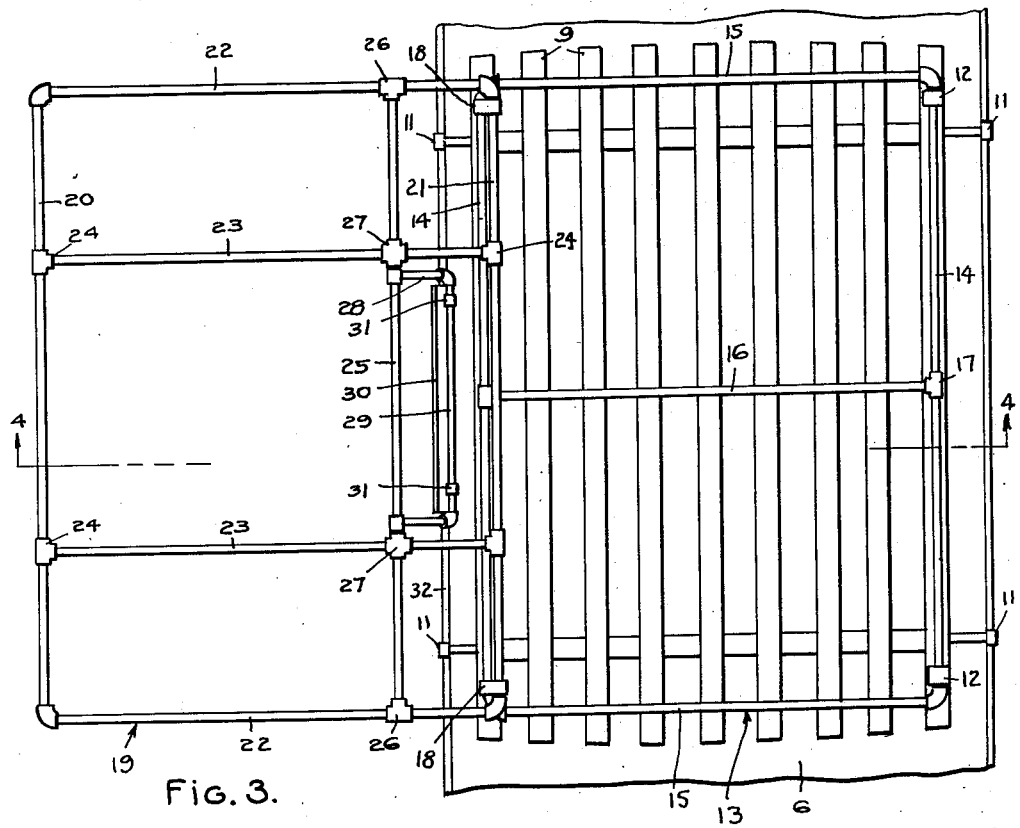
Figure 4:
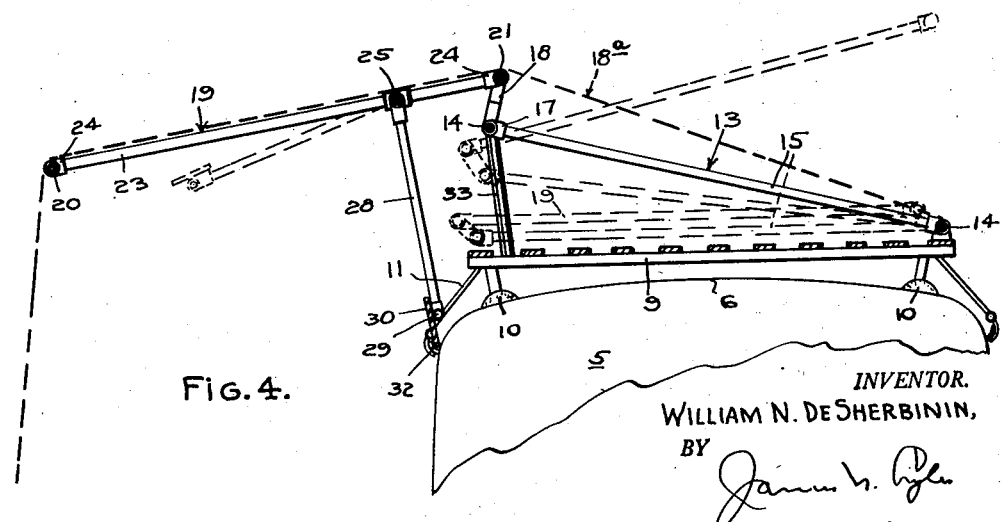

In the drawings:

Figure 1 is a perspective view of a vehicle showing the invention applied thereto with the parts being in the extended position and with the flexible covering and enclosure being shown in dotted lines, Figure 2 is a front end view of the vehicle, showing the frames in the extended position and with the covering being in dotted lines, Figure 3 is a top plan view of the device in the extended position and, Figure 4 is a section taken substantially on line 4—4 of Figure 3.

Referring specifically to the drawings, the numeral 5 designates a vehicle of the type heretofore noted, embodying a roof section 6, a front door 7 and a pair of oppositely swinging doors 8. The door 7 swings in forward direction, and with the forward door 8 swinging forwardly to partially overlie the opening of the door 7 while the rear door 8 swings in a rearward direction to extend outwardly from the vehicle.

Mounted upon the top 6, is a slatted rack 9 that is supported by suction cup devices 10 and tie devices 11. The rack 9 is preferably formed of wood strips, though the construction of the rack may be of any desired form. Hingedly connected as at 12, to one outer-most strip of the rack, is a frame indicated as a whole by the numeral 13. The frame is preferably of tubular form and embodies longitudinal and parallel sections 14, connected at their ends by parallel sections 15. An intermediate section 16 extends across the frame and is connected to the members 14 by couplings 17. The intermediate member 16 constitutes a support for the flexible covering 18ª to prevent undue sagging. Hingedly connected to the frame 13 as at 18 is an extensible frame indicated as a whole by the numeral 19. The frame 19 is likewise of tubular formation and embodies longitudinal members 20 and 21, connected at their ends by transverse tubular members 22. Intermediate tubular members 23 are connected to the members 20 and 21 by couplings 24. The frame 19 also includes a longitudinal tubular member 25 that is connected to the members 22 and 23 by couplings 26 and 27. It will be apparent, that the frame member 19 may be swung upwardly with respect to the frame 13 and then over, to completely overlie and rest upon the frame 13.

It is desirable, that when the device is in the extended position to form a support for a covering that overlies the openings of the doors, that the frame 13 be angled upwardly from the roof of the vehicle, while the frame 19 is angled downwardly, and whereby both frames are sufficiently inclined to provide proper disposal of rainwater. The means for elevating the frame 13 upwardly and to angle the frame 19 downwardly, embodies a generally U-shaped frame member 28 that is hingedly connected to the member 25, preferably inwardly of the couplings 27. Connected to the horizontal flight 29 of the frame 28 is a preferably flat strip 30. The strip 30 is connected to the flight 29 by suitable hinge means 31, whereby the strip is movable to accommodate itself to a supporting position. The frame 28 thus forms a fulcrum for the accurate positioning of the frames 13 and 19. In the fulcrumed position, the lower edge of the strip 30 engages within the conventional drip gutter 32 of the vehicle and, in this position the parts assume their angularity. Means are provided to limit the upward movement of the free side of the frame 13, comprising preferably flexible straps 33, that are collapsible when the device is retracted to its collapsed position. While straps have been shown, any other desirable linkage may be employed that may have adjustable means therein to vary the degree of upward movement of the frame 13 under the influence of the prop 28. The movement of the frame members and the prop is substantially illustrated in Figure 4. The covering 18ª, preferably of canvas, will be attached to the end frame members 15 and 22, the outer frame member 14 and the outer frame member 20, preferably of a single section of material, depending enclosure panels, likewise of canvas may be connected around the marginal portions of the roofing forming panel 18 and with the depending panels being constructed in any desirable manner to form a complete enclosure having suitable openings therein for access to the interior. While not shown, it is contemplated that the depending panels shall be detachably connected to the sides of the vehicle by snap fasteners or the like. It is also contemplated that there shall be connected to the depending panels, a floor forming section of canvas that lies upon the ground and that likewise has connection with the side of the vehicle outwardly of the doors and whereby the entire enclosure will be protected against the elements and against insects.

In the use of the device, referring particularly to Figure 4, the frame member 19 in its collapsed dotted line position is swung upwardly and forwardly to extend outwardly from the side of the vehicle, and carrying with it a flexible covering. While manually holding the frame 19, the prop device 28 is swung downwardly, at which time it is utilized to force the frame 19 in a vertical direction, lifting one side of the frame 13 to substantially its maximum limit as determined by the straps 33. In this position, with a slight additional tension upwardly, the edge of the strip 30 may be snapped into the gutter 32 and will effectively support the frames in a desired angularity and forming an incline roof section for the enclosure and an incline roof section over the major length of the vehicle and whereby to permit of a free circulation of air between the vehicle roof and the flexible covering to thereby successfully maintain a comfortable temperature within the vehicle. The several doors 7 and 8 are then shifted to the open position and the depending panels then snapped into position, with one panel overlying the forward door 7, while an opposite panel overlies a rear door 8. Tie devices and stakes may be employed to give additional rigidity to the enclosure. When the device is to be collapsed, the depending panels are removed after which the prop device 28 is disengaged from the gutter 32 and swung upwardly to lie within the frame 19. When the prop 28 is released, the frame 13 will drop downwardly to lie substantially parallel with the rack 9. The frame 19 is then swung upwardly and over the top of the vehicle to move downwardly under the influence of the hinged device 18 to lie substantially parallel with the frame 13. It will be apparent, that the overlying roof forming panel 18ª will fold inwardly and be supported between the frames. After collapsing, any suitable covering device may be engaged over the entire assembly.

It will be apparent, that a very novel arrangement of frame devices has been provided for the support of a protective covering for vehicles of the type commonly employed for camping and are extensible and collapsible with a minimum of effort and when in the extended position provides a relatively large protective enclosure with the vehicle doors in the open position and whereby the occupants may have free access to and from the interior of the vehicle. Detailed constructions of the various couplings and hinge elements will be entirely apparent and details of the flexible covering will also be apparent. The device is simple in construction, is relatively cheap to manufacture, is strong, durable and permits of its assembly upon the vehicle in a manner that requires no alterations whatever to the vehicle structure. It is contemplated that the several frame members shall be formed of a light weight non-corrosive material such as aluminum and the several elements are such as to require little or no attention.

It is to be understood that the invention is not limited to the precise arrangement of parts, but that changes are contemplated as readily fall within the spirit of the invention as shall be determined by the scope of the subjoined claims.

Having described my invention, what I claim as new and desire to secure by Letters Patent is:

1. A collapsible and extensible shelter device for land vehicles of the type having a closed body and a plurality of side opening doors, a fixed rack device that is supported upon a roof of the vehicle and that extends for the major length and width thereof, first and second frame devices that are generally co-extensive with the rack, the first frame being hingedly connected along one longitudinal edge to the rack and whereby to be swingable in a vertical plane, the second frame being hingedly connected to the free edge of the first frame and swingable in a vertical plane from a position overlying the first frame to a position that extends beyond the side of the vehicle, a prop device hingedly connected to the second frame and swingable to a position whereby to engage a drain gutter formed on the vehicle, the said prop device serving to elevate the frames along the line of their hinged connection with each other and whereby to angle the first frame upwardly from the rack and to angle the second frame downwardly from its point of hinging whereby to form a ridged support, the frames adapted to support a flexible covering that overlies the major area of the vehicle and that forms a shelter outwardly from the side of the vehicle.

2. A structure of the character described for use with a land vehicle having outwardly opening side doors, a rigid rack fixedly disposed upon a roof of the vehicle and with the rack being horizontally arranged and co-extensive with the major area of the roof, first and second frame devices, the first frame device being hingedly connected along one longitudinal side with one longitudinal edge of the rack, the second frame device being hingedly connected to the opposite longitudinal side of the first frame device and whereby the second frame device may be swung to and from an overlying relation to the first frame device, the frame devices being co-extensive with each other, a prop that is hingedly connected to the second frame device and that is swingable to and from a parallel relation thereto, the said prop device being swingable downwardly to have resting engagement within a gutter carried along the marginal edges of the vehicle roof, the said prop device when engaged with the gutter serving to fulcrum the frame devices upwardly along their line of hinged connection, whereby the first frame device is angled upwardly with respect to the rack and the roof of the vehicle while the second frame device is angled downwardly to extend outwardly beyond the side of the vehicle, the second frame device having a length that is co-extensive with the doors of the vehicle, the said frame devices adapted to support a flexible covering that overlies the major portion of the roof of the vehicle and that extends outwardly beyond the side of the vehicle to form an enclosure for the doors when opened.

3. The structure according to claim 2 wherein the frames are formed of tubular sections and wherein the prop device is pivotally connected to the second frame at a point closely adjacent to the point of hinging connection with the first frame.

4. The structure according to claim 2 wherein the hinge connection between the first and second frames are elongated and whereby the frames when angled upwardly dispose one longitudinal edge of the second frame at an elevation above the first frame.

5. The structure according to claim 2 wherein the frames are co-extensive with each other and swingable to overlying collapsed position for resting engagement jointly upon the rack.

6. The structure according to claim 2 wherein means are provided to limit the upward swinging movement of the first frame to a maximum angularity with respect to the rack, the said limiting means being flexible and collapsible when the frames are shifted to overlying relation.

7. The structure according to claim 2 wherein the prop device is of tubular construction and of U-shape, the free ends of the U being hingedly connected to a cross-member of the second frame and whereby the prop may be swung to inoperative position to lie within and parallel to the members constituting the second frame, the prop provided upon its head portion with a flat pivotally connected strip that has resting engagement within the gutter when the prop is swung to a fulcrum position to elevate the frame members to angular positions and whereby to form with the flexible covering a ridged protective roof for the top of the vehicle and that area beyond the side of the vehicle.

No references cited.